United States Patent Office 3,502,628
Patented Mar. 24, 1970

3,502,628
VULCANIZATION ACCELERATORS FOR FLUORINATED POLYMERS AND COMPOSITIONS THEREOF
Arthur Livingston Barney and Wolfgang Honsberg, Wilmington, Del., assignors to E. I. du Pont de Nemours and Company, Wilmington, Del., a corporation of Delaware
No Drawing. Continuation-in-part of application Ser. No. 661,230, Aug. 17, 1967. This application May 22, 1968, Ser. No. 736,786
Int. Cl. C08f 45/72
U.S. Cl. 260—87.7        10 Claims

ABSTRACT OF THE DISCLOSURE

The acceleration of the vulcanization of saturated, fluorinated polymers by the use of tropolone and 1,10-phenanthroline. The accelerators enable a more rapid cure with conventional amine-based vulcanization systems and also enable a satisfactory rate and state of cure with weakly basic bis-nucleophiles otherwise incapable of adequately curing fluorinated polymers.

CROSS-REFERENCE TO RELATED APPLICATION

This application is a continuation of applicants' copending application Ser. No. 661,230, filed Aug. 17, 1967, now abandoned.

BACKGROUND OF THE INVENTION

Field of the invention

This invention relates to the vulcanization of fluorinated polymers and, more particularly, it relates to vulcanizable compositions containing such polymers.

Description of the prior art

The vulcanization of saturated, fluorinated elastomeric polymers is well known. A wide variety of amine-based vulcanization systems have been developed. It is frequently desirable, however, to accomplish the state of cure desired in a shorter time. Moreover, it is sometimes desirable to be able to use as curing agents certain compounds presently somewhat unsatisfactory for that purpose either from a time-delay standpoint or from the ultimate state of cure obtainable therewith.

SUMMARY OF THE INVENTION

In the vulcanization of saturated, fluorinated elastomeric polymers, the improvement of adding to said polymers before vulcanization up to about 5 parts, per 100 parts of polymer, of the compounds tropolone or 1,10-phenanthroline.

DETAILED DESCRIPTION OF THE INVENTION

This invention is applicable to saturated interpolymers of vinylidene fluoride ($VF_2$) with other fluorine-containing ethylenically unsaturated monomers copolymerizable therewith. Typical of the latter are hexafluoropropene (HFP), tetrafluoroethylene (TFE), perfluoroalkyl perfluorovinyl ethers [particularly where the alkyl radical contains from 1 to about 4 carbon atoms such as perfluoro(methyl vinyl ether) and perfluoro(propyl vinyl ether)], trifluorochloroethylene, and pentafluoropropylene. Of particular interest are the vinylidene fluoride/hexafluoropropene copolymers containing from about 70 to about 30 weight percent vinylidene fluoride and about 30 to about 70 weight percent hexaflporopropene (see Rexford, U.S. Patent 3,051,677). Other important polymers are the terpolymers of vinylidene fluoride/hexafluoropropene/tetrafluoroethylene wherein the monomer units are present in the following mole ratios: about 3 to 35 (preferably 15 to 25) weight percent tetrafluoroethylene units and about 97 to 65 (preferably 85 to 75) weight percent vinylidene fluoride and hexafluoropropene units, the latter two being present in a weight ratio of from about 2.5:1 to 0.5:1 (see Pailthorp and Schroeder, U.S. Patent 2,968,649).

Other vinylidene fluoride polymers and their preparation are disclosed in Dittman et al., U.S. Patents 2,738,343 and 2,752,331; Hanford and Roland, U.S. Patent 2,468,664; Brubaker, U.S. Patent 2,393,967; and Honn et al., U.S. Patents 2,833,752 and 2,965,619.

Fluorinated polymers not derived from vinylidene fluoride such as interpolymers of tetrafluoroethylene with perfluoro(alkyl vinyl ethers) can be employed.

The compounds 1,10-phenanthroline and tropolone and their preparation are well known to those skilled in the art.

The amine-based vulcanization of saturated, fluorinated polymers, especially $VF_2$ copolymers, is well known to those skilled in the art. Frequently used are the organic aliphatic diamines, e.g., ethylene diamine or hexamethylene diamine, or their carbamates. The subject has been discussed and explained in publications, such as J. F. Smith, "The Chemistry of Vulcanization of Viton—A Florocarbon Elastomer," Proceedings of International Rubber Conference, pp. 575–581, Washington, November 1959; and Paciorek et al., "Mechanism of Amine Crosslinking of Fluoroelastomers," J. Poly. Sci., vol. XLV, pp. 405, 413 (1960). Although spoken of as amine-based curing, the amines may be used as carbamates, hydrochlorides, oxalates, or reaction products with hydroquinone. Many amine-based systems have been devised to produce special effects using primary, secondary and tertiary amines, aliphatic and aromatic, alone or in combination with other amines. Hydrazine and its derivatives have also been used in such systems.

Amine-based vulcanizations are the subject of many patents, e.g., West, U.S. 2,793,200; Rugg, U.S. 2,933,481; West, U.S. 2,979,490; Smith, U.S. 3,008,916; Griffin, U.S. 3,041,316; and Davis et al., U.S. 3,071,565.

The accelerators of this invention also enable the rapid and satisfactory vulcanization of saturated, fluorinated polymers by using poly(nucleophiles) in a basic system. Representative are bis(nucleophiles) such as dihydroxy aromatic compounds, such as 2,2-bis(4-phenylol)propane (bisphenol-A), 2,2-bis(4-phenylol)perfluoropropane (bisphenol AF), resorcinol, 1,7-dihydroxynaphthalene, 4,4'-dihydroxydiphenyl, 4,4'-dihydroxystilbene, 2,6-dihydroxyanthracene, hydroquinone, or their alkali or alkaline earth metal salts; lower aliphatic diols, e.g., 1,3-propanediol and 1,6-hexanediol; dithiols, such as p-xylyldithiol; various weakly basic aromatic diamines like methylenedianiline, o-, m- and p-phenylenediamine; and bis-hydrazinium oxalate. Other polynucleophiles include pentaerythritol, diphenylsilanediol and 1,3,5-trihydroxybenzene. The various nucleophilic groups need not be the same.

The accelerators of this invention are normally used in the presence of basic divalent metal oxides such as MgO, CaO, ZnO, PbO, $Pb_3O_4$, BaO and basic metal hydroxides such as $Mg(OH)_2$, $Ca(OH)_2$ and $Ba(OH)_2$. The latter may be used to form complexes with the crowns before use.

This invention is particularly useful because it offers routes to faster vulcanization with lower amounts of polyamine compound, thus reducing cost and reducing the amounts of excess polyamines which are believed to be deleterious for best heat resistance. The accelerator compounds of this invention also enable the use of various materials as curing agents which could not be satisfactorily employed alone. It has been found that the accelerator compounds of this invention do not by themselves effect curing even when as much as 5 parts are used.

The invention will now be described in relation to examples of specific embodiments thereof wherein parts and percentages are by weight unless otherwise specified.

A. Procedure for compounding, vulcanizing and testing fluorine-containing copolymers On a cool, 2-roll rubber mill, 100 parts of a copolymer of vinylidene fluoride and hexafluoropropene containing 60 and 40 weight percent, respectively, are compounded with 20 parts of medium thermal carbon black and 15 parts of magnesium oxide.[1] Except as noted, 135 parts of this composition are used for further compounding with the vulcanizing agents and accelerators described in the examples. The compositions are sheeted off the mill and specimens for physical testing are prepared. An oscillating disc rheometer (ODR) is used to determine rapidity of cure after selected times that a test piece is held at curing conditions. The ODR measures the relative viscosity of an elastomer by oscillating (e.g., at 900 r.p.m.) a grooved conical disc through 3 degrees of arc while pressed tightly between two test pieces. The amount of torque required to oscillate the disc is reported as the measure of viscosity.

Vulcanizates are prepared by compression molding of appropriate samples in a press for 30 minutes at 163° C. followed by removing them from the mold and "post-curing" by heating in an air oven to 204° C. over a 4-hour period and then an additional 24 hours at this temperature.

EXAMPLE

SEQUESTERING COMPOUNDS AS ACCELERATORS FOR HEXAMETHYLENEDIAMINE (HMDAC)

Procedure A is followed using HMDAC (1.5 parts) and the following accelerators:

| | | | |
|---|---|---|---|
| Parts of 1,10-phenanthroline | *0 | 5 | |
| Parts of tropolone | 0 | | 5 |

| Oscillating disc rheometer at 160° C. (inch pounds of torque) | | | |
|---|---|---|---|
| After 2.5 minutes | 3 | 64 | 9 |
| After 5 minutes | 10 | 94 | 29 |
| After 10 minutes | 38 | 104 | 67 |
| After 20 minutes | 55 | 112 | 83 |

* Outside the invention—for comparison only.

As many widely different embodiments of this invention may be made without departing from the spirit and scope thereof, it is to be understood that this invention is not limited to the specific embodiments thereof axcept as defined in the appended claims, and all changes which come within the meaning and range of equivalence are intended to be embraced therein.

We claim:
1. In the vulcanization of saturated, fluorinated elastomeric polymers; the improvement of adding to said polymers before vulcanization an effective amount up to about 5 parts, per 100 parts of polymer, of the selected compounds tropolone or 1,10-phenanthroline.
2. The process as defined in claim 1 wherein said polymers are copolymers of vinylidene fluoride with at least one other fluorinated monomer copolymerizable therewith.
3. The process as defined in claim 2 wherein said vulcanization improved is an amine-based vulcanization conducted in the presence of a basic divalent metal oxide.
4. The process as defined in claim 2 wherein the compound selected is tropolone.
5. The process as defined in claim 2 wherein the compound selected is 1,10-phenanthroline.
6. A vulcanizable, saturated, fluorinated elastomeric polymer containing an effective amount up to about 5 parts, per 100 parts of polymer, of the selected compounds tropolone or 1,10-phenanthroline.
7. A vulcanizable, saturated, fluorinated elastomeric polymer as defined in claim 6 wherein said polymer is a copolymer of vinylidene fluoride with at least one other fluorinated monomer copolymerizable therewith.
8. A vulcanizable, saturated, fluorinated elastomeric polymer as defined in claim 6 wherein said polymer is a copolymer of vinylidene fluoride and hexafluoropropene.
9. A vulcanizable, saturated, fluorinated elastomeric polymer as defined in claim 6 wherein the compound selected is 1,10-phenanthroline.
10. A vulcanizable, saturated, fluorinated elastomeric polymer as defined in claim 6 wherein the compound selected is tropolone.

References Cited

UNITED STATES PATENTS 3,023,187  2/1962  Lo _____ 260—41
3,039,992  6/1962  Smith _____ 260—45.7

JOSEPH L. SCHOFER, Primary Examiner

JOHN KIGHT, Assistant Examiner

U.S. Cl. X.R.

260—45.8, 80.77

---
[1] Having an iodine number of about 43.